UNITED STATES PATENT OFFICE.

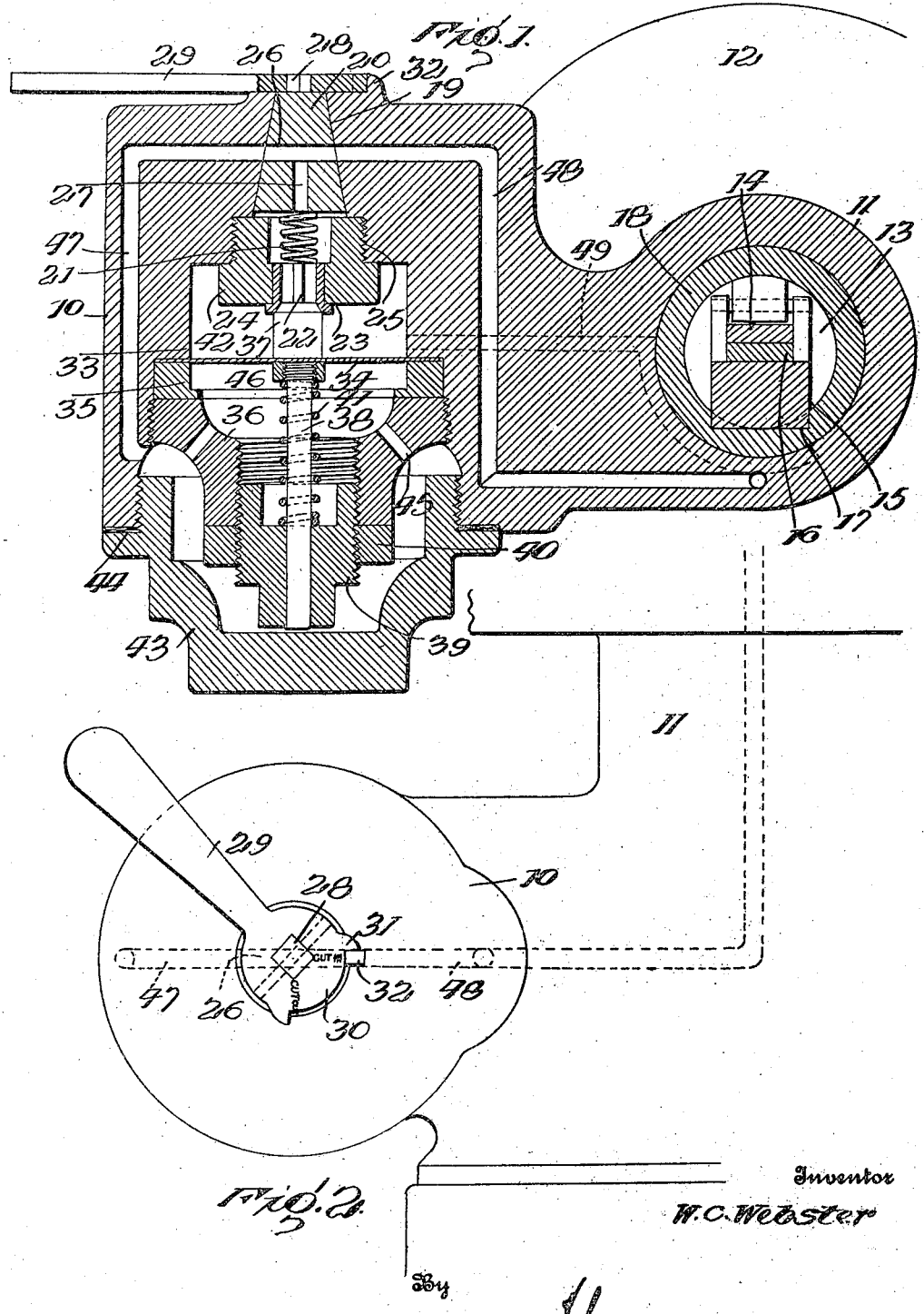

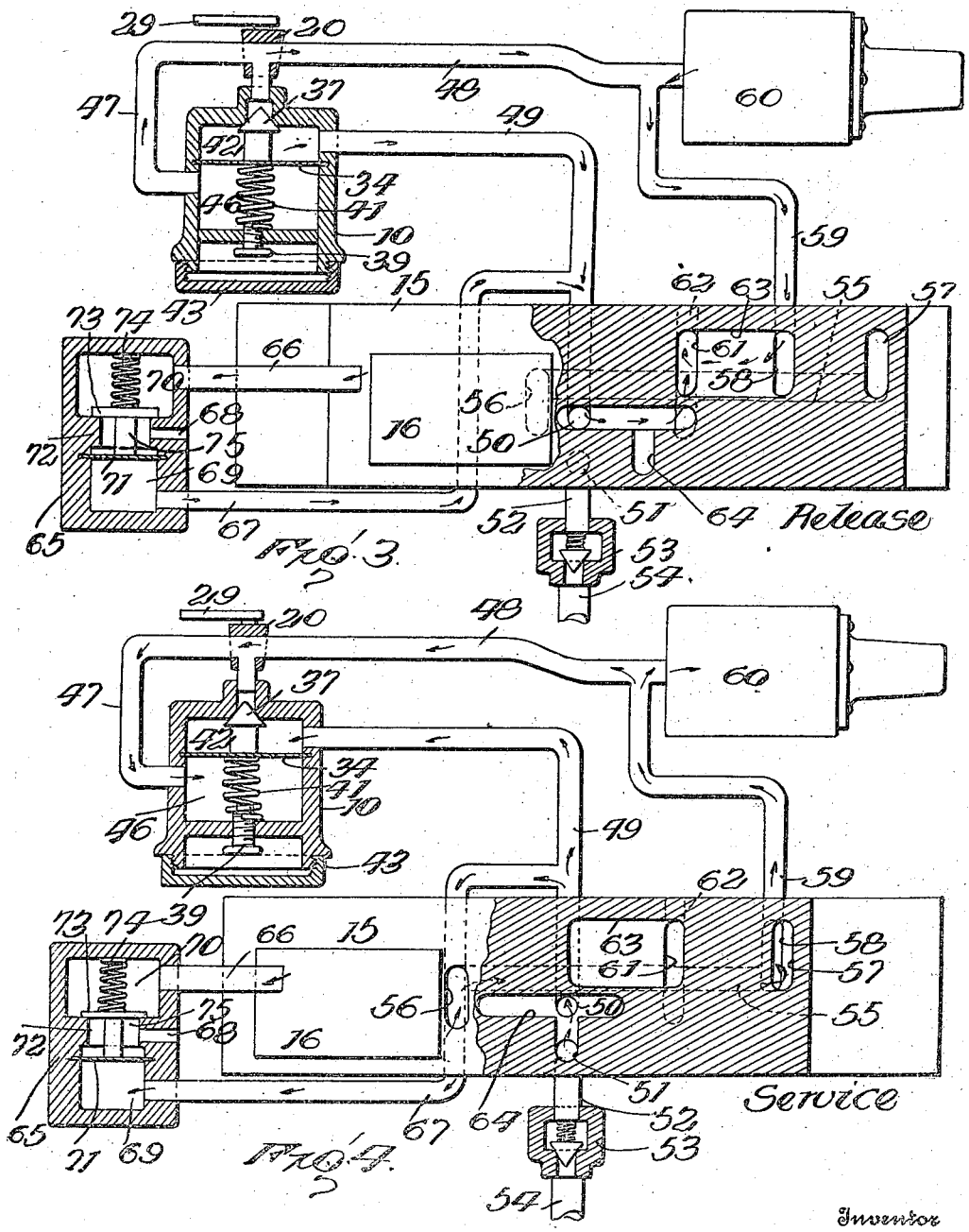

WILLIS C. WEBSTER, OF DUBOIS, PENNSYLVANIA.

EXCESS-BRAKE-CYLINDER-PRESSURE-CONTROL MECHANISM.

1,250,111. Specification of Letters Patent. Patented Dec. 11, 1917.

Application filed June 19, 1915. Serial No. 35,054.

*To all whom it may concern:*

Be it known that I, WILLIS C. WEBSTER, a citizen of the United States, residing at Dubois, in the county of Clearfield and State of Pennsylvania, have invented certain new and useful Improvements in Excess-Brake-Cylinder-Pressure-Control Mechanisms, of which the following is a specification.

My present invention relates to new and useful improvements in or attachments for triple valves in fluid pressure brake systems, the primary object of my invention being the provision of a device for controlling excess brake cylinder pressure. More particularly, this application constitutes a division of a copending application for a triple valve, filed by me May 28, 1914, and bearing the Serial No. 841,918.

This invention comprehends the provision of a mechanism whereby the engineer of a train may, with a very slight reduction of train line pressure, obtain any desired pressure in the brake cylinders of the train. Heretofore, this has, at times, been accomplished by the employment of supplemental reservoirs connected to the auxiliary reservoirs to increase their volume in order that a greater volume of air or other fluid would be admitted to the brake cylinders upon any given train line reduction. This method has been found unsatisfactory, due to the fact that the supplemental reservoirs increase the fluid volume of the brake system to such an extent that oftentimes the train line, auxiliary reservoirs and supplemental reservoirs cannot be properly built up between service applications of the brakes. This is particularly true when operating a train in mountainous country where frequent brake applications are commonly required. In this connection, one of the chief objects of my present invention consists in providing for excess pressure in the brake cylinders without increasing the fluid volume of the brake system and without, therefore, increasing the length of time required to recharge the system after release of the brakes.

Another method sometimes employed to obtain unusually high brake cylinder pressure has been to increase the train line pressure above normal and to depend upon unusually heavy train line reductions, but this method again, in effect, increases the volume of the system as all pressure vented from the train line must be again built up in order to release the brakes. Frequently after a series of unusually heavy reductions, the entire system will equalize and render it practically impossible to obtain release of the brakes.

A still further object of my present invention, therefore, consists in providing a mechanism for controlling excess pressure in the brake cylinders and for supplying said pressure which will operate upon the first slight train line reduction and which, in fact, will give a greater excess pressure in the brake cylinders upon a slight reduction than upon a heavy reduction.

Upon long trains, however, it is practically impossible, with the types of triple valves now in use, to obtain release of the brakes at the rear end of the train unless a heavy reduction has been made. In order to overcome this difficulty, I also provide means for insuring release of the brakes upon the first slight rise in train line pressure in order that I may utilize small train line reductions for applying the brakes, irrespective of the length of the train.

It will of course be apparent that the amount of pressure in the brake cylinders, which may be desired, in excess of the normal brake cylinder pressure for any given reduction, will vary with circumstances, depending upon the character of the road over which the train is traveling and upon how heavily the cars are loaded, and a yet further object of my invention consists in providing an excess brake cylinder control mechanism which may be adjusted to meet these varying requirements. For instance, if the country is mountainous, the controlling mechanism may be adjusted upon each car to give any desired excess pressure, while if some of the cars are exceptionally heavily loaded and others merely loaded to their usual capacity, the controlling mechanism upon the heavily loaded cars may be set to give a considerable excess brake cylinder pressure and the mechanisms upon the normally loaded cars set to give a lower excess brake cylinder pressure.

In this connection, it will be apparent that in handling mixed trains made up of loaded and empty cars, it would be detrimental to apply the brakes, under excessive pressure, upon the empty cars although such excess pressure would be advantageous upon the heavily loaded cars.

A further object of my invention, therefore, consists in providing the excess brake cylinder pressure control mechanism with a cut off cock, whereby the mechanism may be cut out upon the empty cars and the brakes of such cars operated at normal brake cylinder pressure.

A still further object of my present invention consists in the provision of a mechanism for securing excess pressure in the brake cylinders of such a character that it will only operate with train line pressures above normal, thereby permitting the handling of the car in the usual manner with normal train line pressure, except at such times when the excess pressure may be needed. By making the operation of my excess pressure control mechanism dependent upon train line pressure, it will be clear that the engineer may control the operation of the various mechanisms upon all the cars without leaving the cab of his locomotive, merely by adjusting the feed valve which controls the supply of air or other fluid from the main reservoir to the train line.

As excess brake cylinder pressure is usually desired only with exceptionally heavily loaded cars or with trains operating in a mountainous country, it will be apparent that at the time such pressure is desired, it is also desirable to be able to secure a relatively quick application of the brakes and for this reason, a still further object of my invention consists in so arranging the control mechanism that in its operation it will cause a serial venting of the train line and consequent quick application of the brakes throughout the length of the train.

I further comprehend the provision of a mechanism of the above described character which shall be automatic in its operation, simple and economical in construction and which may be formed as an integral part of the triple valve or as an attachment applicable to triple valves of standard type, with but slight modifications in the valve structure.

With these and other objects in view, my invention will be more fully described, illustrated in the accompanying drawings, and then specifically pointed out in the claims which are attached to and form a part of this application.

In the drawings:

Figure 1 is a vertical, central sectional view taken through my improved excess brake cylinder pressure control mechanism, the slide valve and allied parts of a triple valve being also shown in transverse section;

Fig. 2 is a top plan view of the controlling mechanism;

Fig. 3 is a diagrammatic view of the control mechanism and such parts of the air brake system as are necessary to disclose its operation, the system being here shown in release position;

Fig. 4 is a view similar to Fig. 3, but illustrating the system in service position.

Corresponding and like parts are referred to in the following description and indicated in all the views of the accompanying drawings by the same reference characters.

For the sake of clearness I have illustrated my excess brake cylinder pressure control mechanism as inclosed in a casing 10 formed integrally with the slide valve portion of a triple valve casing 11 connected in the usual manner to an auxiliary reservoir 12. It will be understood, however, that if the device is to be applied to triple valves now in use, the casing 10 will be formed as a separate casing and it and the casing of the triple valve will be cored to provide for proper communication between the two when the casing of the excess brake cylinder pressure control mechanism is attached to that of the triple valve, these changes being well within the skill of the average mechanic. For the sake of simplicity, I have illustrated only such portions of the triple valve as are essential to the understanding of the operation of my improved excess brake cylinder pressure control mechanism and the auxiliary reservoir venting valve which coöperates with it and only such of the ports and passages of the slide valve seat, slide valve and graduating valve as are necessary to a perfect comprehension of my present invention.

Although my excess brake cylinder pressure control mechanism is primarily intended for use with an improved triple valve of the type disclosed in my previously referred to application, the ports and passages illustrated in the present case are, with the exception of such new ones as are necessitated by the addition of the mechanisms constituting my present invention, those of a conventional triple valve in order that the construction and operation of my excess brake cylinder pressure controlling mechanism may be disclosed with the greatest possible clearness and simplicity.

The triple valve is provided with the usual slide valve chamber 13 communicating at one end with the auxiliary reservoir and at its other end with the chamber of the piston, the stem of which is shown at 14 as engaging the slide valve 15 and graduating valve 16. As is usual, the slide valve 15 is movable over the valve seat 17 formed in the valve seat bushing 18, while the graduating valve 16 is movable over the upper face of the slide valve 15.

The casing 10 of my excess brake cylinder pressure control mechanism is preferably cylindrical in shape with an open lower end and with a frusto-conical seat forming an opening 19 in its upper end. A frusto-conical valve 20 of the turn plug type engages the valve seat 19 and is held in close engagement with such seat by a helical spring 21 engaging against the lower larger end of the valve 20 and against the spider portion 22 of a valve bushing 23 carried by a plug 24 threaded into a recess 25 immediately below the valve seat 19. This valve 20 is provided with a diametrically formed passage 26 and with an axial passage 27 communicating with the intermediate portion of the passage 26 and opening through the lower end of the valve 20 in such a manner that fluid passing through the valve seat or bushing 23 may enter the passage 26 of the cut-off valve 20. The cut-off valve 20 is provided at its upper outer end with a squared stem 28 to receive an operating handle 29, the head portion 30 of which is formed with laterally directed stops 31 disposed at substantially 90° to each other and engageable with a stop lug 32 projecting from the upper end of the casing 10. It will therefore be clear that turning movement of the valve 20 is limited to 90° and that in one extreme limit of movement of the valve handle, the valve will be opened and in the other extreme limit of movement, the valve will be closed, these positions being termed the cut in and out positions of the valve 20 which, in effect, constitutes a cut-off cock by means of which my excess brake cylinder pressure control mechanism may be thrown in and out of operation upon the individual cars.

The casing 10 is formed intermediate its length with an annular shoulder 33 to seat the peripheral edge of a diaphragm 34 which is securely held against the shoulder by a clamping ring 35 engaging the lower face of the diaphragm and held in such engagement by an inner cap or bonnet 36 threaded into the open lower end of the casing. This diaphragm carries a valve 37 which coöperates with the valve seat 23 and extending below the diaphragm is the valve stem 38 which reciprocates through an adjusting plug 39 threaded in the cap or bonnet 36 and secured in adjusted position by a lock nut 40. A helical spring 41 engages the adjusting plug 39 and diaphragm 34 and it will therefore be clear that by proper adjustment of this spring by the plug 39, the diaphragm may be supported to withstand any desired pressure in the chamber 42 above it. An outer cap or bonnet 43 closes the lower end of the casing 10, a suitable packing ring or gasket 44 being exposed between it and the casing in order to insure a fluid tight joint. As shown, the inner cap or bonnet 36 is formed with equalizing passages 45 in order that the space between the inner and outer caps and the space between the inner cap and diaphragm 34 may constitute a single chamber, indicated by the numeral 46.

The wall of the casing 10 is cored to provide a passage 47 leading from the chamber 46 to the valve 20 and adapted, in cut in position of the valve, to communicate with its passage 26 and so with a passage 48 cored through that portion of the casing connecting the triple valve and controlling valve. This passage 48 leads to the brake cylinder, as illustrated diagrammatically in Figs. 3 and 4 of the drawings. As a matter of fact, this passage, as a rule, communicates with the brake cylinder indirectly through the various ports and passages of the slide valve employed in transmitting fluid from the auxiliary reservoir to the brake cylinder, but these ports and passages form no part of the present invention and I have not deemed it necessary, therefore, to illustrate the triple valve structure in such detail as to show them and have shown a direct connection between this passage 48 and brake cylinder in the diagrammatic views in order to simplify the disclosure of my invention. The casing is also cored to provide a passage 49 communicating at one end with the chamber 42 above the diaphragm 34 and at its other end with a port 50 formed in the slide valve seat 17 and in transverse alinement with a second port 51 also formed in the seat and communicating with a passage 52 leading to the usual check valve 53 from which leads the train line 54.

The slide valve 15 is formed with a longitudinal passage 55 opening at one end into a cavity 56 formed in the upper face of the valve and at its other end into a cavity 57 formed in the lower face of the valve. In release position, the graduating valve 16 laps the cavity 56, while upon the first movement of the triple valve, to service position, the graduating valve uncovers this cavity. The cavity 57 is adapted to register with a port 58 formed in the valve seat when the slide valve is in service position and a passage 59 leads from this port to the passage 48 and so to the brake cylinder 60. A port 61, formed transversely of the slide valve seat, communicates with a passage 62 leading to the atmosphere and the slide valve is provided in its lower face with a cavity 63 adapted, in release position of the slide valve, to establish communication between the ports 58 and 61. Furthermore, the slide valve is formed in its lower face with a substantially T-shaped cavity 64 adapted, in release position of the slide valve, to establish communication between the ports 50 and 61 and in service position of the valve to establish communication between the ports 50 and 51.

Co-acting with the above described triple valve and excess brake cylinder pressure-controlling mechanism, is a device for venting auxiliary reservoir pressure which is more fully illustrated and described in my previously referred to application for a triple valve and also in a divisional application of the triple valve, specifically covering it, filed by me June 19, 1915, and bearing the Serial No. 35055. For this reason I have illustrated it in the present case only diagrammatically as such is a sufficient showing to bring out its operation and coaction with my excess brake cylinder pressure controlling mechanism. This auxiliary reservoir venting device includes a valve casing 65 having a passage 66 leading from one end to the auxiliary reservoir and a passage 67 leading from its opposite end to the passage 49 and so to the port 50 in the slide valve seat. This valve casing 65 is provided intermediate its length with an atmospheric vent passage 68 and the space within the casing is divided into two chambers 69 and 70 by a diaphragm 71, this diaphragm extending across the casing between the passage 67 and atmospheric vent passage 68. The casing is further provided, between the atmospheric vent passage 68 and passage 66, with a valve seat 72 co-acting with which is a valve 73 which controls passage of fluid from the chamber 70 to the atmospheric passage 68. This valve is normally held to its seat by a relatively light helical spring 74 and is adapted to be opened by excess pressure in the chamber 69 over that in the chamber 70, due to the connection of the stem 75 of the valve to the diaphragm 71. As will be noted, the lower face of the diaphragm 71, exposed to the pressure in the chamber 69, is equal in area to the upper face of the valve 73 exposed to pressure in the chamber 70 and only such excess of pressure in the chamber 69 over that in the chamber 70 as is equal to the spring 74 is necessary to cause the opening of the valve 75 and consequent venting of auxiliary reservoir pressure through the passage 66, chamber 70 and atmospheric vent passage 68.

In describing the operation of my present invention I will assume that the relative volumes of the auxiliary reservoir and brake cylinder are such that, leaving the excess brake cylinder pressure controlling mechanism out of the question, and considering the train line pressure to be seventy pounds, a five pound reduction in train line pressure will result in a pressure in the brake cylinder of approximately twelve and one-half pounds. Under these conditions I ordinarily adjust the tension of the spring 41 in such a manner that it will exert a pressure against the diaphragm 34 of substantially fifty-two to fifty-three pounds in order that when the chamber 42 is subjected to the reduced train line pressure of sixty-five pounds, the under face of the diaphragm 34 will be subjected to substantially the same pressure, due to the added pressures of the spring 41 and the back pressure from the brake cylinder 60 through the passages 47 and 48, under which circumstances, the valve 37 will remain closed.

Referring more specifically to Fig. 3 of the drawings, it will be seen that when the triple valve is in release position, assuming that the cut-off cock 20 is in open or cut in position, the pressure chamber 42 will be opened to the atmosphere through the passage 49, port 50, cavity 64, port 61 and passage 62, while the pressure chamber 46 will also be opened to the atmosphere through the passage 47, cut-off cock 20, passage 48, passage 59, port 58, cavity 63, port 61 and passage 62 and the brake cylinder will be opened to the atmosphere through the passage 59, port 58, cavity 63, port 61 and passage 62. The chamber 70 of the auxiliary reservoir venting valve will, at this time, be subject to auxiliary reservoir pressure through the passage 66, while the chamber 69 of such valve will be open to the atmosphere through the passage 67, passage 49, port 50, cavity 64, port 61 and passage 62. There will, therefore, be auxiliary reservoir pressure in the chamber 70 of the auxiliary reservoir venting valve, atmospheric pressure in the chamber 69 of the same valve and atmospheric pressure in the chambers 42 and 46 of the excess brake cylinder pressure control valve and in the brake cylinder 60.

Assuming now that with a train line pressure of seventy pounds the engineer operates his brake valve to secure a five pound train line reduction, it will be clear that the triple valve piston will move to service position, carrying with it the slide valve and graduating valve, the movement of the graduating valve, as usual, being such as to open the port 56. Under these conditions, auxiliary reservoir air will pass through the cavity 56, passage 55, cavity 57, port 58 and passage 59 to the brake cylinder 60 until the pressure in the auxiliary reservoir is equal to the reduced train line pressure of sixty-five pounds, when the triple valve piston will move back sufficiently to cause the graduating valve 16 to lap the cavity 56 of the slide valve and cut off further flow of air from the auxiliary reservoir to the brake cylinder. By this means, a volume of air has been admitted to the brake cylinder in the usual manner sufficient to create a braking pressure of approximately twelve and one-half pounds therein.

This movement of the slide valve, to service position, causes the cavity 64 to establish communication between the ports 50 and 51 with the result that the train line pressure of sixty-five pounds will pass through the passage 52, port 51, cavity 64, port 50 and passage 49 into the pressure chamber 42 of my excess brake cylinder pressure control valve. This pressure of sixty-five pounds in the chamber 42 will, however, be balanced or substantially balanced by the combined pressure of twelve and one-half pounds in the brake cylinder and the pressure of fifty-two to fifty-three pounds resulting from the spring 41 and the valve 37 will, therefore, remain closed and no air will enter the brake cylinder from the train line. It will of course be clear that a portion of the air entering the passage 49 from the train line will pass through the passage 67 into the pressure chamber 69 of the auxiliary reservoir venting valve and will there be balanced by the auxiliary reservoir pressure in the upper chamber 70 of such valve.

Upon recharging of the train line to effect a release of the brakes, it will be clear that as soon as the train line pressure is increased to any appreciable extent, say a few ounces, the excess pressure thus trapped in the pressure chamber 69 of the auxiliary reservoir venting valve will cause an opening of the valve 73 and consequent venting of a portion of the air from the auxiliary reservoir through the passage 66, chamber 70 and atmospheric vent port 68 which, in turn, will result in a rapid movement of the piston and slide valve of the triple valve to release position and consequent venting of the brake cylinder, pressure chambers of the excess brake cylinder pressure control mechanism and pressure chamber 69 of the auxiliary reservoir venting valve to the atmosphere. It will therefore be clear that with standard train line pressure and the above described adjustment of the spring 41, there will be no increase in brake cylinder pressure, due to my improved mechanism, for which reason the engineer of the train may operate the train with the cut-off cocks of such mechanisms open with normal train line pressure, in the usual manner.

Now, on the other hand, I will assume that the engineer wishes to obtain an excess pressure in the brake cylinder upon the same five pound reduction in train line pressure. To accomplish this, he will raise the train line pressure to any given extent, depending upon the amount of excess pressure which he desires, say for instance, to ninety pounds. Under these circumstances, upon the making of a five pound reduction in train line pressure and a consequent movement of the triple valve, to service position, air will enter the pressure chamber 42 of the excess brake cylinder pressure control valve at the reduced train line pressure of eighty-five pounds and the lower face of the diaphragm 34 being at this time subjected only to a pressure of substantially sixty-five pounds, it will be clear that the valve 37 will be forced open. Train line air will then flow from the pressure chamber 42 through the cut-off cock 20 and passage 48 to the brake cylinder 60 until the back pressure of fluid in the brake cylinder through the passage 47 into the chamber 46, together with the pressure of the spring 41, will balance the train line pressure of eighty-five pounds, that is, until the pressure in the brake cylinder 60 has been raised to thirty-two or thirty-three pounds, that is, until an excess brake cylinder pressure of twenty pounds has been attained. It will of course be understood that after making the five pound reduction, or whatever reduction is desired, the brake valve will be turned to running service position in order that it may supply air to the train line to maintain the reduced train line pressure irrespective of what air may be drawn from the train line and supplied to the brake cylinders.

In other words, if the train line pressure is above normal, the excess brake cylinder pressure controlling mechanism or valve will operate both in service and service lap position of the triple valve to supply train line air to the brake cylinder 60 until its pressure exceeds the normal brake cylinder pressure, for the same reduction, to the extent of the difference between the reduced train line pressure and the sum of the normal brake cylinder pressure for the reduction made and the pressure of the spring 41.

From this, it will be seen that the less the train line reduction made the greater the excess pressure obtained in the brake cylinder will be as the heavier the reduction in the train line, the greater the normal brake cylinder pressure acting in the pressure chamber 46 will be, and the less the train line pressure acting in the chamber 42 will be. It is, therefore, customary to apply the brakes by train line reductions as low as two, three and four pounds when my improved excess brake cylinder pressure control mechanism is in operation and to vary the excess pressure which will be obtained by varying the extent to which the train line pressure is raised above normal during release of the brakes. It is, therefore, possible for the engineer to obtain any desired excess pressure in the brake cylinder with a small train line reduction by utilizing a train line pressure above normal and to secure the normal pressure in the brake cylinder by utilizing a normal train line pressure without in any way adjusting the excess brake cylinder pressure controlling valves of the various cars.

It will of course be understood that upon release of the brakes, the brake cylinder, pressure chambers of the excess brake cylinder pressure controlling valve and pressure chamber 69 of the auxiliary reservoir venting valve will be vented to the atmosphere in the manner previously described.

With the long trains, it is often impossible to obtain release of the brakes, particularly at the rear of the train, unless a heavy train line reduction has first been made and it will be clear that under such circumstances, the mechanism constituting my present invention would be worthless were it not for the provision of the auxiliary reservoir venting valve which renders it possible to release the brakes upon a slight rise in train line pressure, irrespective of the length of the train line or the amount of reduction which has been previously made in it, as the excess brake cylinder pressure control mechanism would have no useful function if large reductions in train line pressure were necessary before the brakes could be released as these large reductions would prevent supplying of excess pressure to the brake cylinders by my device.

It will of course be clear that by shutting the cut-off cocks 20 throughout the length of the train, my excess brake cylinder pressure control mechanisms may be cut out and the system operated in the usual manner, either at normal train line pressure or at higher train line pressures. The chief function of this cut out cock, however, is to permit the mechanisms of certain of the cars of the train being cut out, while the mechanisms of the remaining cars of the train are in operation. The advantages of this are obvious as will be apparent from a consideration of the operation of brakes upon a mixed train made up of loaded and unloaded cars. Clearly, an excessive brake cylinder pressure in the cylinders of loaded cars of such a train is advantageous, while it is equally clear that such excessive pressure in the brake cylinders of the empty cars would be detrimental. With my mechanism, together with the cut out cock, it is possible to obtain excessive brake cylinder pressure upon the loaded cars and normal brake cylinder pressure upon the unloaded cars.

As previously stated, my improved excess brake cylinder pressure control mechanism may also be utilized to obtain a serial venting of the train line upon service application of the brakes, if desired. This is accomplished by setting the springs 41 of the mechanisms in such a manner that operating under normal train line pressure a reduction in train line pressure to apply the brakes, such as is commonly made, as for instance, five pounds, will still leave a train line high enough to overcome the combined pressure of the springs and normal brake cylinder pressures in the chambers 46 and so cause feeding of a small quantity of train line air through my improved mechanisms to the brake cylinders. Of course, it will be clear that whenever my mechanisms are cut in and the train is operated with abnormally high train line pressures, serial venting will occur.

Having thus described the invention, what is claimed as new is:

1. In fluid pressure brake systems, the combination with a brake cylinder, a train line, an auxiliary reservoir and a triple valve adapted, in service position, to supply fluid from the auxiliary reservoir to the brake cylinder, of additional means operable during service application and also in service lap position for supplying fluid to the brake cylinder to create a pressure in excess of that which should normally be created by fluid supplied from the auxiliary reservoir.

2. In fluid pressure brake systems, the combination with a brake cylinder, a train line, an auxiliary reservoir and a triple valve adapted, in service position, to supply fluid from the auxiliary reservoir to the brake cylinder, of means operable during service application and also in service lap position for supplying fluid from the train line to the brake cylinder to create a pressure in excess of that which should normally be created by fluid supplied from the auxiliary reservoir.

3. In fluid pressure brake systems, the combination with a brake cylinder, a train line, an auxiliary reservoir and a triple valve adapted, in service position, to supply fluid from the auxiliary reservoir to the brake cylinder, of means operable during service application and also in service lap position for supplying fluid from the train line to the brake cylinder in excess of that supplied from the auxiliary reservoir, the amount of excess pressure thus supplied being dependent upon train line pressure.

4. In fluid pressure brake systems, the combination with a brake cylinder, a train line, an auxiliary reservoir and a triple valve adapted, in service position, to supply fluid from the auxiliary reservoir to the brake cylinder, of means for supplying fluid from the train line to the brake cylinder in excess of that supplied from the auxiliary reservoir, the amount of excess pressure thus supplied being dependent upon train line pressure, and means independent of train line pressure for additionally controlling the amount of excess pressure supplied.

5. In fluid pressure brake systems, the combination with a brake cylinder, a train line, an auxiliary reservoir and a triple valve adapted, in service position, to supply fluid from the auxiliary reservoir to the brake cylinder, of means for supplying fluid from the train line to the brake cylinder in excess of that supplied from the auxiliary reservoir, and means for controlling the amount of excess pressure supplied to the brake cylinder.

6. In fluid pressure brake systems, the combination with a brake cylinder, a train line, an auxiliary reservoir and a triple valve adapted, in service position, to supply fluid from the auxiliary reservoir to the brake cylinder, of means for supplying excess pressure to the brake cylinder when the train line pressure is above normal, said means being inoperative when the train line pressure is at or below normal.

7. In fluid pressure brake systems, the combination with a brake cylinder, a train line, an auxiliary reservoir and a triple valve adapted, in service position, to supply fluid from the auxiliary reservoir to the brake cylinder, of means for supplying excess pressure to the brake cylinder when the train line pressure is above normal, said means being inoperative when the train line pressure is at or below normal, and means for adjusting the amount of pressure so supplied.

8. In fluid pressure brake systems, the combination with a brake cylinder, a train line, an auxiliary reservoir and a triple valve adapted, in service position, to supply fluid from the auxiliary reservoir to the brake cylinder, of means operable when the train line pressure is above normal for supplying excess pressure to the brake cylinder, said means causing serial venting of the train line.

9. In fluid pressure brake systems, the combination with a brake cylinder, a train line, an auxiliary reservoir and a triple valve adapted, in service position, to supply fluid from the auxiliary reservoir to the brake cylinder, of means operable when the train line pressure is above normal for supplying excess pressure to the brake cylinder, said means causing serial venting of the train line, and means capable of being operated to prevent supply of excess pressure to the brake cylinder, irrespective of train line pressure.

10. In a fluid pressure brake system, the combination with a brake cylinder, a train line, an auxiliary reservoir and a triple valve adapted, in service position, to supply fluid from the auxiliary reservoir to the brake cylinder, of means for supplying fluid from the train line to the brake cylinder to create a pressure in excess of that which should normally be created by the service application made, and means operable upon a gradual increase in train line pressure for venting the auxiliary reservoir to cause the triple valve to move to release position.

11. In a fluid pressure brake system, the combination with a brake cylinder, a train line, an auxiliary reservoir and a triple valve adapted, in service position, to supply fluid from the auxiliary reservoir to the brake cylinder, of means for supplying fluid from the train line to the brake cylinder, and means operable upon any increase, gradual or rapid, in train line pressure for venting the auxiliary reservoir to cause the triple valve to move to release position, said means operating at any train line pressure slightly above the auxiliary reservoir pressure.

12. In a fluid pressure brake system, the combination with a brake cylinder, train line and auxiliary reservoir, of a triple valve having a slide valve seat, slide valve and graduating valve adapted, in service position of the triple valve, to supply auxiliary reservoir pressure to the brake cylinder and in release position to vent the brake cylinder to the atmosphere, said slide valve seat having a port communicating with the train line and an additional port communicating with a passage, while the slide valve has a cavity adapted, in service position, to establish communication between such ports, a valve casing, fluid pressure controlled means dividing the valve casing, the passage leading from the second mentioned port of the slide valve seat communicating with one end of the casing, communicating means between the brake cylinder and opposite end of the casing, the valve controlling flow of pressure from the first end of the casing to such communicating means, and additional means in the other end of the casing offering resistance to the opening of the valve.

13. In a fluid pressure brake system, the combination with a brake cylinder, a train line and an auxiliary reservoir, of a valve casing, a diaphragm dividing the valve casing into pressure chambers, communicating means between both pressure chambers and the brake cylinder, a valve carried by the diaphragm and normally closing communication between one of the pressure chambers and the brake cylinder, a spring tending to normally hold the valve in closed position, and a triple valve adapted, in service position, to establish communication between the train line and that pressure chamber communicating with the brake cylinder through the valve.

14. In a fluid pressure brake system, the combination with a brake cylinder, train line and triple valve, of a valve casing formed with balancing pressure chambers, a valve controlled by the pressure chambers and controlling flow of fluid from one of them to the brake cylinder, the other pressure chamber being subjected to brake cylinder pressure and the pressure of an adjustable spring, and means operable upon movement of the triple valve to service position for subjecting the first chamber to train line pressure.

15. In a fluid pressure brake system, the combination with a brake cylinder, train line and triple valve, of a valve casing formed with balancing pressure chambers, a valve controlled by the pressure chambers and controlling flow of fluid from one of them to the brake cylinder, the other pressure chamber being subjected to brake cylinder pressure and the pressure of an adjustable spring, means operable upon movement of the triple valve to service position for subjecting the first chamber to train line pressure, and means operable upon movement of the triple valve to release position for venting both of the chambers and the brake cylinder to the atmosphere.

16. In a fluid pressure brake system, the combination with a brake cylinder, train line and triple valve, of a valve casing formed with balancing pressure chambers, a valve controlled by the pressure chambers and controlling flow of fluid from one of them to the brake cylinder, the other pressure chamber being subjected to brake cylinder pressure and the pressure of an adjustable spring, means operable upon movement of the triple valve to service position for subjecting the first chamber to train line pressure, and means operable upon any slight increase in train line pressure when the triple valve is in service position for venting both of the chambers and the brake cylinder to the atmosphere.

17. In a fluid pressure brake system, the combination with a brake cylinder, auxiliary reservoir, train line and triple valve adapted, in service position, to supply fluid from the auxiliary reservoir to the brake cylinder and in release position to vent the brake cylinder to the atmosphere, of additional means operable during service application and also in service lap position for supplying train line pressure to the brake cylinder to create a pressure in excess of that which should normally be created by the auxiliary reservoir pressure supplied thereto.

18. In a fluid pressure brake system, the combination with a brake cylinder, auxiliary reservoir, train line and triple valve adapted, in service position, to supply fluid from the auxiliary reservoir to the brake cylinder and in release position to vent the brake cylinder to the atmosphere, of additional means for supplying train line pressure to the brake cylinder in excess of the auxiliary reservoir pressure supplied thereto, and manually operated means for cutting out said additional means.

19. In a fluid pressure brake system, the combination with a brake cylinder, auxiliary reservoir, train line and triple valve adapted, in service position, to supply fluid from the auxiliary reservoir to the brake cylinder and in release position to vent the brake cylinder to the atmosphere, of additional means for supplying train line pressure to the brake cylinder in excess of the auxiliary reservoir pressure supplied thereto, and means for adjusting the amount of train line pressure so supplied.

20. In a fluid pressure brake system, the combination with a brake cylinder, auxiliary reservoir, train line and triple valve adapted, in service position, to supply fluid from the auxiliary reservoir to the brake cylinder and in release position to vent the brake cylinder to the atmosphere, of additional means for supplying train line pressure to the brake cylinder in excess of the auxiliary reservoir pressure supplied thereto, means for adjusting the amount of train line pressure so supplied, and manually operable means for cutting out the means for supplying train line pressure to the brake cylinder.

21. In a fluid pressure brake system, the combination with a brake cylinder, auxiliary reservoir, train line and triple valve controlling supply of auxiliary reservoir pressure to the brake cylinder and venting of the brake cylinder, of means operable at high train line pressures for supplying pressure to the brake cylinder in addition to that supplied from the auxiliary reservoir.

22. In a fluid pressure brake system, the combination with a brake cylinder, auxiliary reservoir, train line and triple valve controlling supply of auxiliary reservoir pressure to the brake cylinder and venting of the brake cylinder, of means operable at high train line pressures for supplying excess pressure to the brake cylinder in addition to that supplied from the auxiliary reservoir, said means including a controlling valve in communication with the brake cylinder and ports and passages in the triple valve adapted in a certain position of the triple valve to establish communication between the controlling valve and train line.

23. In a fluid pressure brake system, the combination with a brake cylinder, auxiliary reservoir, train line and triple valve controlling supply of auxiliary reservoir pressure to the brake cylinder and venting of the brake cylinder, of means operable at high train line pressures for supplying excess pressure to the brake cylinder, said means including a controlling valve in communication with the brake cylinder, and ports and passages in the triple valve adapted in a certain position of the triple valve to establish communication between the controlling valve and train line, said controlling valve supplying excess fluid pressure to the brake cylinder substantially equal to the train line pressure after any given reduction less the sum of the normal brake cylinder pressure for such reduction and a certain predetermined pressure.

24. In a fluid pressure brake system, the combination with a brake cylinder, auxiliary reservoir, train line and triple valve controlling supply of auxiliary reservoir pressure to the brake cylinder and venting of the brake cylinder, of means operable at high train line pressures for supplying excess pressure to the brake cylinder, said means including a controlling valve in communication with the brake cylinder, and ports and passages in the triple valve adapted in a certain position of the triple valve to establish communication between the controlling valve and train line, said controlling valve supplying excess fluid pressure to the brake cylinder substantially equal to the train line pressure after any given reduction less the sum of the normal brake cylinder pressure for such reduction and a certain predetermined pressure, and means for selectively adjusting said predetermined pressure to vary the amount of excess pressure supplied to the brake cylinder, irrespective of the train line pressure.

25. In fluid pressure brake systems, an excess brake cylinder pressure control valve including a valve casing, a diaphragm extending across the valve casing to form opposed pressure chambers, means adapted to establish communication between each chamber and a brake cylinder, a valve carried by the diaphragm controlling communication between one chamber and the brake cylinder, means adapted to establish communication between such chamber and the train line, and means in the other chamber tending to prevent opening of the valve.

26. In fluid pressure brake systems, an excess brake cylinder pressure control valve including a valve casing, a diaphragm extending across the valve casing to form opposed pressure chambers, means adapted to establish communication between each chamber and a brake cylinder, a valve carried by the diaphragm controlling communication between one chamber and the brake cylinder, means adapted to establish communication between such chamber and the train line, and means in the other chamber tending to prevent opening of the valve, said latter means including a spring engaging the diaphragm, and means for adjusting the tension of the spring.

27. In fluid pressure brake systems, an excess brake cylinder pressure control valve including a valve casing, a diaphragm extending across the valve casing to form opposed pressure chambers, means adapted to establish communication between each chamber and a brake cylinder, a valve carried by the diaphragm controlling communication between one chamber and the brake cylinder, means adapted to establish communication between such chamber and the train line, and means in the other chamber tending to prevent opening of the valve, said latter means including a spring engaging the diaphragm, means for adjusting the tension of the spring, and a manually operable cut-off valve simultaneously controlling communication between both chambers and the brake cylinder.

28. In a fluid pressure brake system, the combination with a brake cylinder, auxiliary reservoir, train line and triple valve, of means operable in service and service lap positions of the triple valve for establishing communication between the train line and brake cylinder, whereby pressure in the cylinder may be increased beyond the normal pressure for the application made.

29. In a fluid pressure brake system, the combination with a brake cylinder, auxiliary reservoir, train line and triple valve, of means operable only when the train line pressure is above normal for supplying additional air to the cylinder upon a service application of the brakes.

30. In a fluid pressure brake system, the combination with a brake cylinder, auxiliary reservoir, train line and triple valve, of means operable only when the train line pressure is above normal for supplying additional air to the cylinder upon a service application of the brakes, said means supplying air in proportion to the abnormal train line pressure.

31. In fluid pressure brake systems, the combination with a brake cylinder, a train line, an auxiliary reservoir and a triple valve adapted, in service position, to supply fluid from the auxiliary reservoir to the brake cylinder, of means operable in service lap position for supplying fluid to the brake cylinder in addition to that supplied from the auxiliary reservoir to create a pressure in excess of that which should normally be created by fluid supplied from the auxiliary reservoir.

32. In fluid pressure brake systems, the combination with a brake cylinder, a train line, an auxiliary reservoir and a triple valve adapted, in service position, to supply fluid from the auxiliary reservoir to the brake cylinder, of means operable in both service and service lap positions for supplying fluid from the train line to the brake cylinder in addition to that supplied from the auxiliary reservoir to create a pressure in the brake cylinder in excess of that which should normally be created by the fluid supplied from the auxiliary reservoir.

33. In fluid pressure brake systems, the combination with a brake cylinder, a train line, an auxiliary reservoir and a triple valve adapted, in service position, to supply fluid from the auxiliary reservoir to the brake cylinder, of means operable in both service and service lap positions for supplying fluid from the train line to the brake cylinder in addition to that supplied from the auxiliary reservoir to create a pressure in the brake cylinder in excess of that which should normally be created by the fluid supplied from the auxiliary reservoir, the amount of excess pressure thus supplied being dependent upon train line pressure.

In testimony whereof I affix my signature.

WILLIS C. WEBSTER. [L. S.]

Copies of this patent may be obtained for five cents each, by addressing the "Commissioner of Patents, Washington, D. C."